(12) United States Patent
Chagnot et al.

(10) Patent No.: US 9,333,592 B2
(45) Date of Patent: May 10, 2016

(54) LASER CUTTING METHOD OPTIMIZED IN TERMS OF THE AMOUNT OF AEROSOLS

(75) Inventors: Christophe Chagnot, Velizy-Villacoublay (FR); Gaétan Canneau, Avignon (FR); Guy Pilot, Magny les Hameaux (FR); Sylvain Fauvel, Bures sur Yvette (FR)

(73) Assignees: COMMISSARIAT A L'ENERGIE ATOMIQUE ET AUX ENERGIES ALTERNATIVES (FR); Institut de Radioprotection et de Sûreté Nucléaire (FR)

( * ) Notice: Subject to any disclaimer, the term of this patent is extended or adjusted under 35 U.S.C. 154(b) by 461 days.

(21) Appl. No.: 13/882,838

(22) PCT Filed: Oct. 28, 2011

(86) PCT No.: PCT/EP2011/068964
§ 371 (c)(1),
(2), (4) Date: Nov. 11, 2013

(87) PCT Pub. No.: WO2012/059420
PCT Pub. Date: May 10, 2012

(65) Prior Publication Data
US 2014/0054274 A1 Feb. 27, 2014

(30) Foreign Application Priority Data

Nov. 2, 2010 (FR) ..................................... 10 58993

(51) Int. Cl.
*B23K 26/08* (2014.01)
*B23K 26/36* (2014.01)
(Continued)

(52) U.S. Cl.
CPC ............. *B23K 26/38* (2013.01); *B23K 26/0626* (2013.01); *B23K 26/14* (2013.01); *B23K 26/36* (2013.01); *B23K 26/08* (2013.01); *G21D 1/003* (2013.01)

(58) Field of Classification Search
CPC ......... B23K 26/08; B23K 26/36; B23K 26/38
USPC ............. 219/121.62, 121.67, 121.72; 372/31, 372/38.01, 38.02
See application file for complete search history.

(56) References Cited

U.S. PATENT DOCUMENTS

| 6,086,204 A * | 7/2000 | Magnante ............ A61B 3/1015 219/121.75 |
| 2012/0123399 A1* | 5/2012 | Belikov ............... A61B 18/201 606/16 |
| 2014/0271328 A1* | 9/2014 | Burris ................ B23K 26/0807 419/53 |

FOREIGN PATENT DOCUMENTS

JP  2006007304 A  1/2006

OTHER PUBLICATIONS

Bohme et al., "Handbuch der Schweissverfahren", Teil 2", Handbuch Der Schweissverfahren, XX, XX, Jan. 1, 1992 , pp. 174-175.
(Continued)

*Primary Examiner* — Samuel M Heinrich
(74) *Attorney, Agent, or Firm* — Lerner, David, Littenberg, Krumholz & Mentlik, LLP

(57) ABSTRACT

The invention relates to an optimized laser cutting method for cutting a part from a material by means of a cutting system comprising: a laser source for producing a laser beam having a certain power; and a cutting head comprising an end nozzle for passage of a cutting laser beam, wherein the method comprises: determining a cutting power Pd such that Pd=Max (Popt;λe) where Max is the mathematical operator of the maximum, Popt is an optimal power of the laser beam of the cutting system, which is predetermined in accordance with the part to be cut, and/or with cutting parameters and/or with system parameters, in order to minimize the amount of aerosols produced when the part is cut, λ is a leading coefficient representing the number of kW required for cutting the part per mm of the thickness of the part, and e is the thickness of the part in mm.

6 Claims, 9 Drawing Sheets

(51) Int. Cl.
*B23K 26/38* (2014.01)
*B23K 26/06* (2014.01)
*B23K 26/14* (2014.01)
*G21D 1/00* (2006.01)

(56) References Cited

OTHER PUBLICATIONS

Drygalla M. et al., "Modularised laser beam cutting technology for dismantling applications", Welding in the World, Elsevier/Inernational Institute of Welding, Roissy, FR, vol. 51. No. 9/10, Sep. 1, 2007. pp. 17-23.

French Preliminary Search Report for Application No. FR 1058993 dated Jun. 27, 2011.

International Search Report for Application No. PCT/EP2012/068964 dated Jan. 19, 2012.

Pavele L A, "Effects of the Energy and Gas- Hydrodynamic Parameters of the Laser Cutting Process on the Formation of Cut Surfaces" Welding International, Taylor & Francis, Abingdon, GB, vol. 20, No. 4, Jan. 1, 2006, pp. 316-321.

Ricerche A, "Laser Beam Cutting and Sealing of Piping from High-Risk Plants", Welding International, Taylor & Francis, Abingdon, GB, vol. 9, No. 8, Jan. 1, 1995, pp. 629-633.

\* cited by examiner

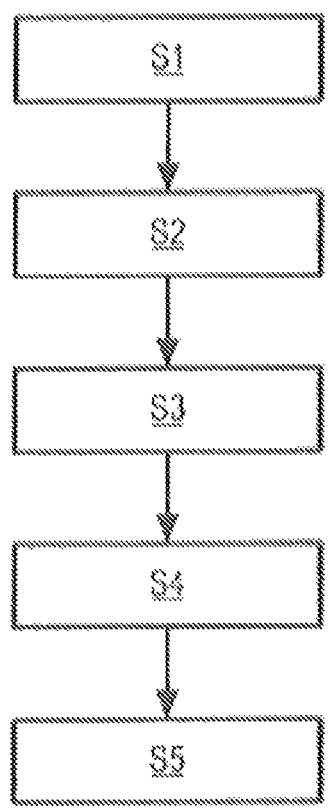

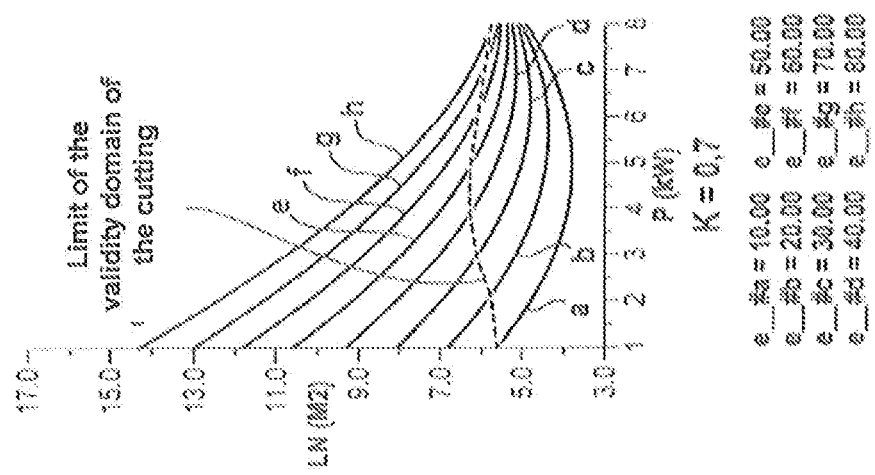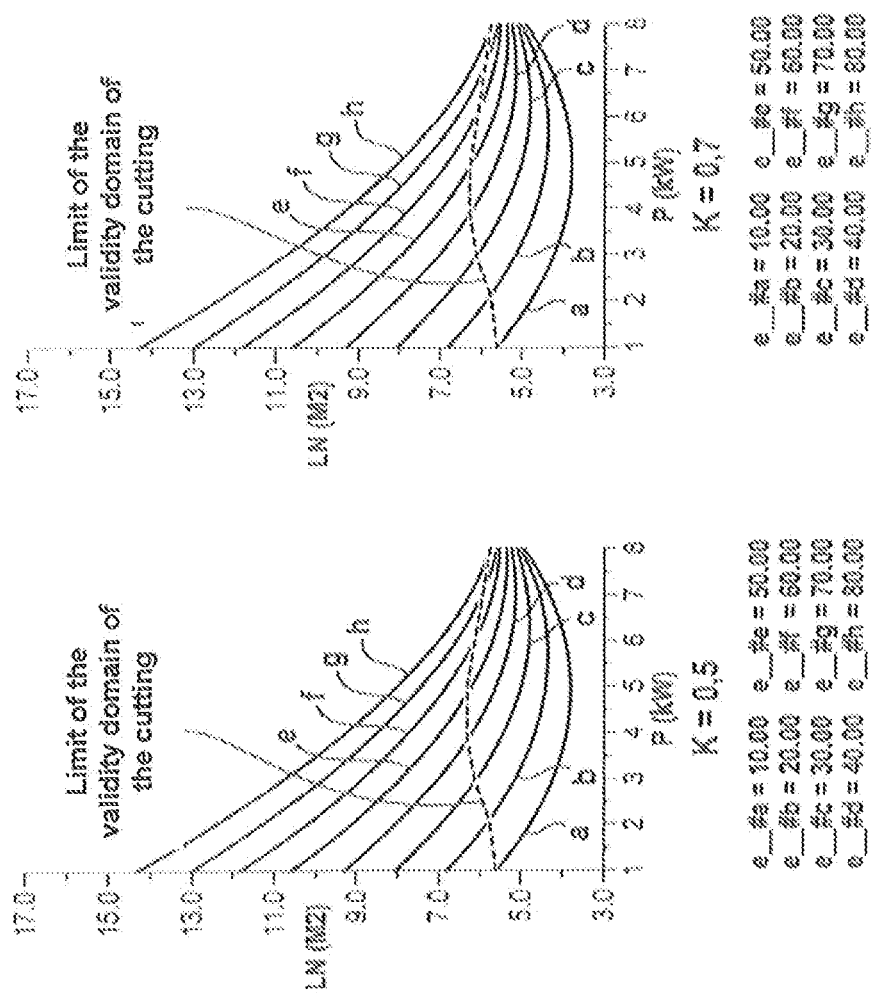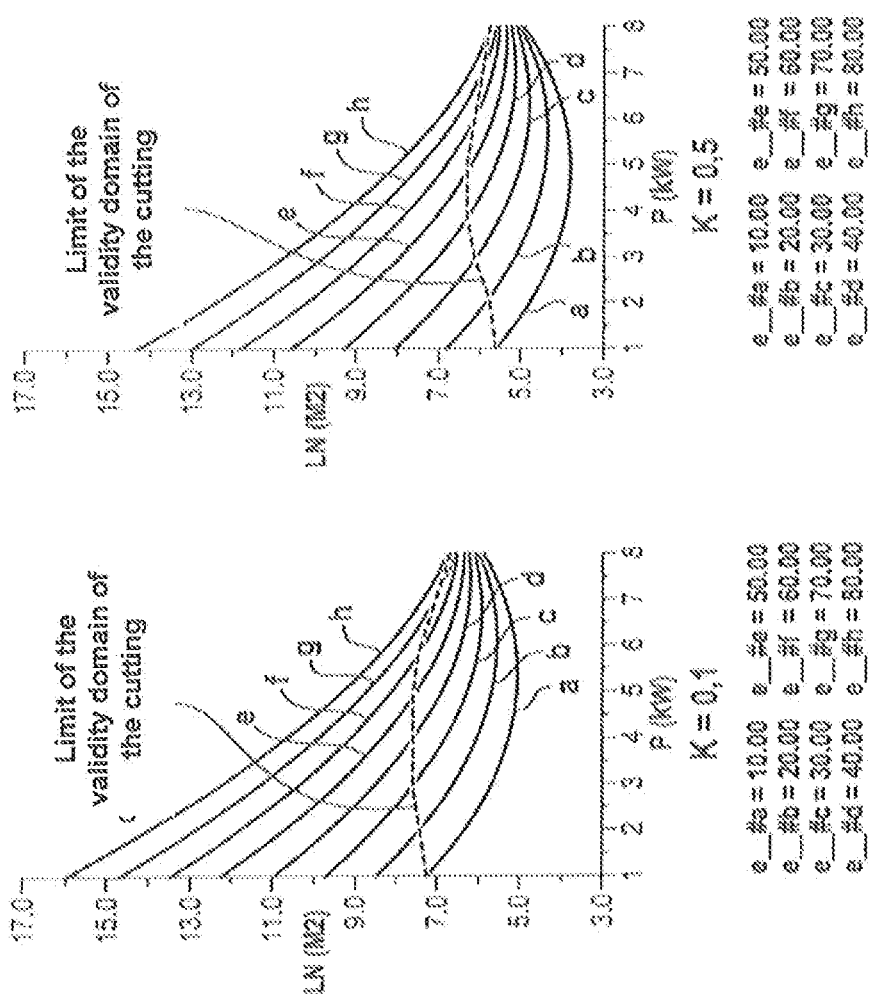

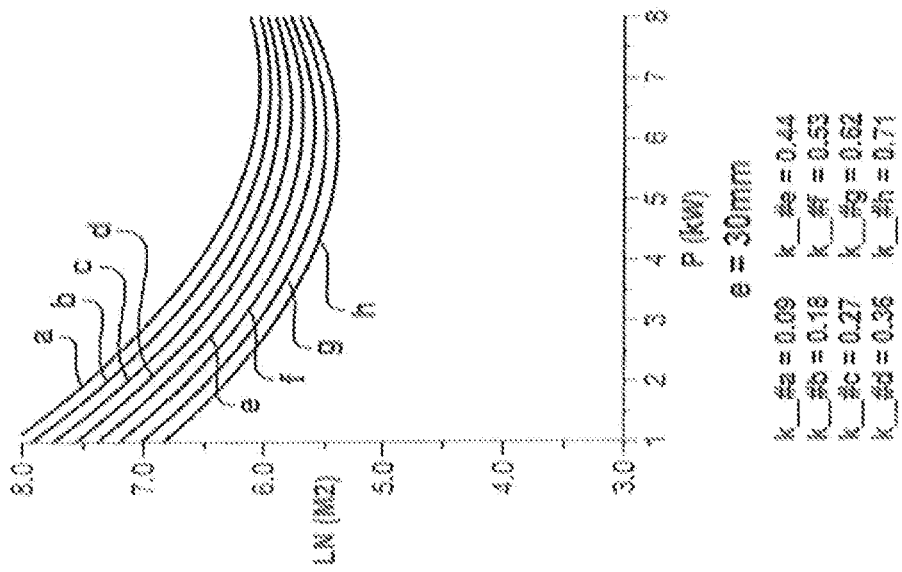
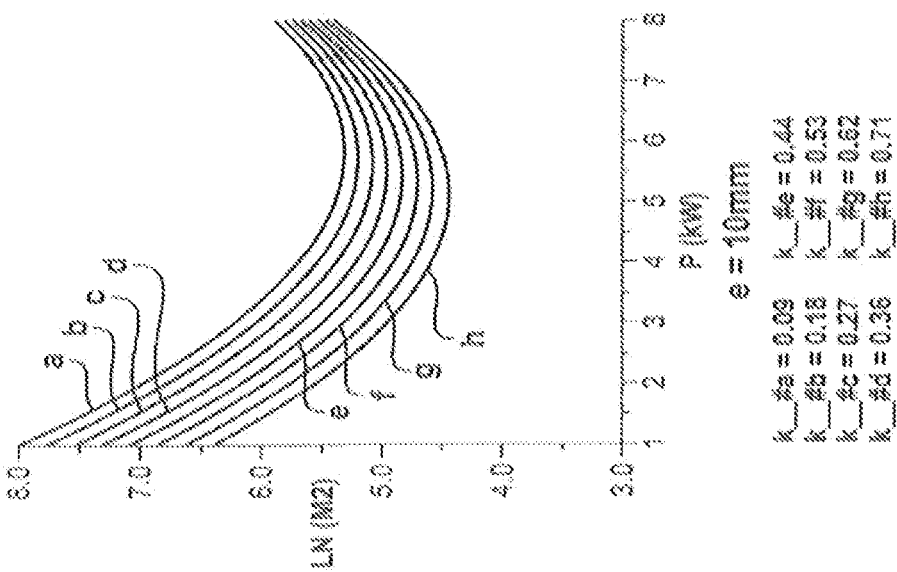

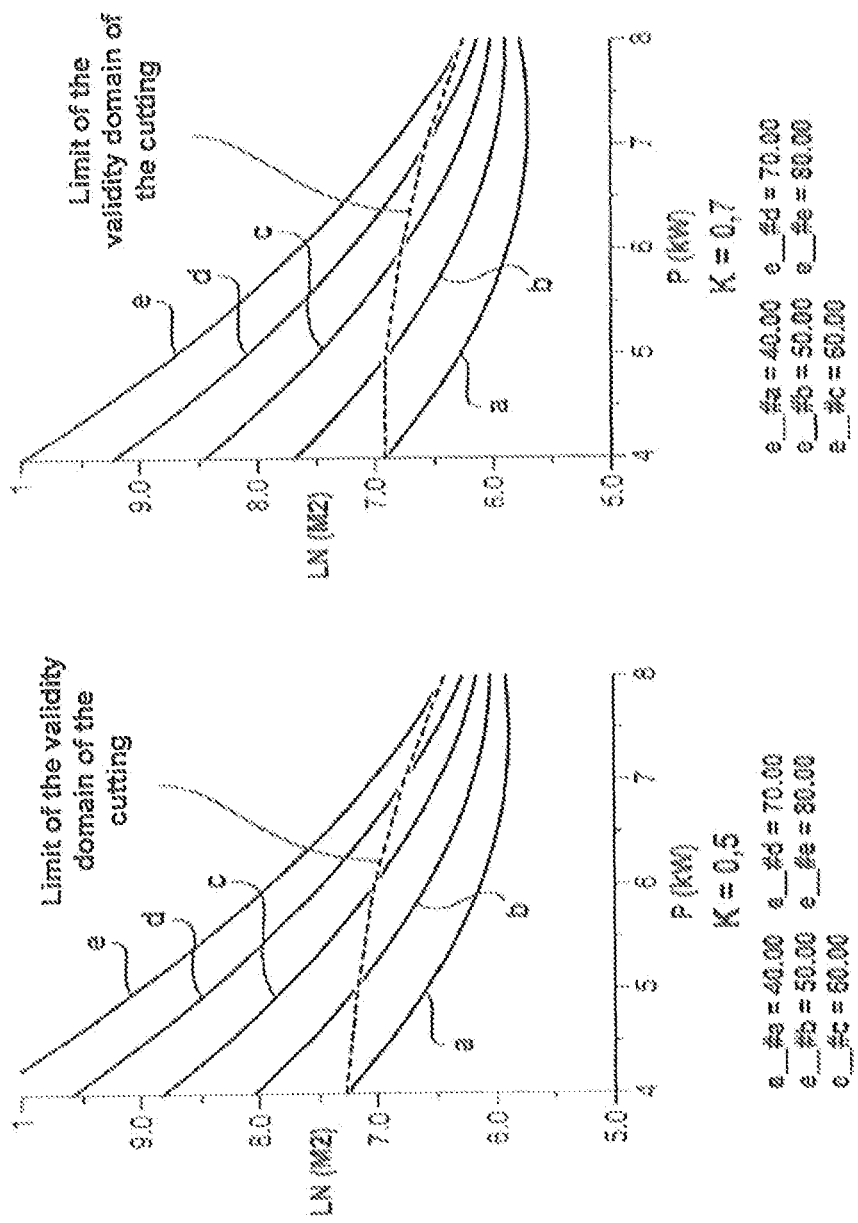

LASER CUTTING METHOD OPTIMIZED IN TERMS OF THE AMOUNT OF AEROSOLS

CROSS REFERENCE TO RELATED APPLICATIONS

The present application is a national phase entry under 35 U.S.C. §371 of International Application No. PCT/EP2011/068964, filed Oct. 28, 2011, published in French, which claims priority from French Patent Application No. 1058993, filed Nov. 2, 2010, the disclosures of which are incorporated by reference herein.

General Technical Field

The present invention relates to an optimized laser cutting method for cutting a part from a material by means of a cutting system comprising
 a laser source for producing a laser beam having a certain power, and
 a cutting head comprising an end nozzle for the passage of the cutting laser beam.

PRIOR ART

An application of lasers for cutting materials, particularly metals, is known.

Laser cutting is very efficient, but produces three types of undesirable residues:
 slag adhering to the surface of the cut-out material, in other words solid particles constituted by ejection of molten material from the cutting groove and compounds thereof formed by oxidoreduction as well as accumulation of impurities during the melting of the cut material;
 sedimented slag, in other words slag not adhering to the surface of the cut-out material and falling by gravity;
 aerosols, in other words solid particles formed by the projection and the vaporisation of a part of the material from the cutting and the constitution of compounds formed by oxidoreduction during the melting of the cut material, but remaining in suspension in a surrounding gaseous environment, in other words having a negligible fall velocity.

Dispersion of sedimented slag and aerosols in the surrounding environment is difficult to control.

It will be easily understood that when laser cutting is used for dismantling nuclear facilities, the residues are even more undesirable, because they contain irradiated or contaminated materials, which are consequently radioactive.

Aerosol collection devices comprising filters are thus provided. However, the aerosols clog and irradiate the filters, which thus need to be replaced often and treated as waste.

It is wished in particular to replace the filters less often.

No optimized laser cutting method exists at the present time that makes it possible to limit the production of aerosols.

DESCRIPTION OF THE INVENTION

The invention proposes overcoming at least one of these drawbacks.

To this end, according to the invention an optimized laser cutting method for cutting out a piece from a material by a cutting system is proposed and comprises
 a laser source for producing a laser beam having a power, and
 a cutting head comprising an end nozzle for the passage of the cutting laser beam, wherein the method is characterized in that it comprises a step of determining a cutting power $Pd$ such that $$Pd = \mathrm{Max}(Popt; \lambda e)$$

where Max is the mathematical operator of the maximum,
 Popt is an optimal power of the laser beam of the cutting system, which is determined in accordance with the piece to be cut-out, and/or
 with cutting parameters and/or
 with the type of system,
in order to minimize the amount of aerosols produced when the piece (1) is being cut-out,
 $\lambda$ is a leading coefficient representing the number of kW required for cutting out the piece per mm of thickness of the part, and
 e is the piece thickness, in mm.

The invention is advantageously completed by the following characteristics, taken alone or in any technically possible combination thereof:
 the determination of Popt is carried out by means of a predetermined quadruplet of constants $(\alpha; \beta; \gamma; \delta)$, representative of the type of cutting system, such that:

$$Popt = \alpha \cdot DB + \beta \cdot e + \gamma \cdot k + \delta$$

where DB is the diameter of the nozzle, in millimeters,
 e is the piece thickness, in millimeters, and
 k is the limit speed coefficient of the cutting head, namely the ratio between the standard cutting speed and the limit cutting speed of the piece;
 the predetermined quadruplet of constants $(\alpha; \beta; \gamma; \delta)$, representative of a cutting system comprising a laser source of yttrium aluminium garnet YAG type for a laser beam having a wavelength of the order of 1 μm, is $(-0.14; 0.07; -1.12; 5.64)$,
 the method comprises an initial step of determining an expression of the power of the laser beam in accordance with the piece to be cut out, and/or with cutting parameters, and/or with the type of system, initial step according to which:
 the system performs a plurality of test cuttings of a piece while varying the power of the beam, and/or the piece to be cut out, and/or the cutting parameters and/or the type of system;
 a sensor performs a plurality of corresponding measurements of the amount of aerosols produced during each test cutting of the piece,
 a computer
 expresses the amount of aerosols produced during each test cutting of the piece in accordance with the power of the beam, and/or with the piece to be cut out, and/or with cutting parameters and/or with the type of system;
 performs a partial derivative of the expression of the amount of aerosols produced, with respect to the power of the laser beam, and determines the expression making it possible to cancel out said partial derivative in accordance with the piece to be cut out, and/or with cutting parameters and/or with the type of system.

The invention has numerous advantages.

Dispersion of aerosols in the surrounding environment is easier to control and reduced, what is advantageous in the case where laser cutting is used for dismantling nuclear facilities. The number of filters required, and consequently the number of wastes, is thereby reduced.

The power is always chosen so that cutting is effective.

DESCRIPTION OF DRAWINGS

Other characteristics, aims and advantages of the invention will become apparent from the description that follows, which is exclusively illustrative and non-limiting, and which should be read with reference to the appended drawings, among which:

FIG. 2 illustrate the main sub-steps of a method according to the invention;

FIG. 6 illustrate the effect of the power of the laser on the production of aerosols as a function of the piece thickness e, for speed coefficients k of 0.1, 0.5 and 0.7 (H=30 mm) for a DB equal to 6 mm;

FIG. 7 illustrate the effect of the power of the laser on the production of aerosols as a function of the speed coefficients k, for thicknesses e of 10 and 30 mm (H=30 mm) for a DB equal to 3 mm;

FIG. 9 illustrate the effect of the power of the laser on the production of aerosols as a function of the piece thickness e, for speed coefficients of 0.5 and 0.7 (H=30 mm, DB=3 mm).

In all of the figures, similar elements bear identical reference signs.

DETAILED DESCRIPTION

Figure 1:
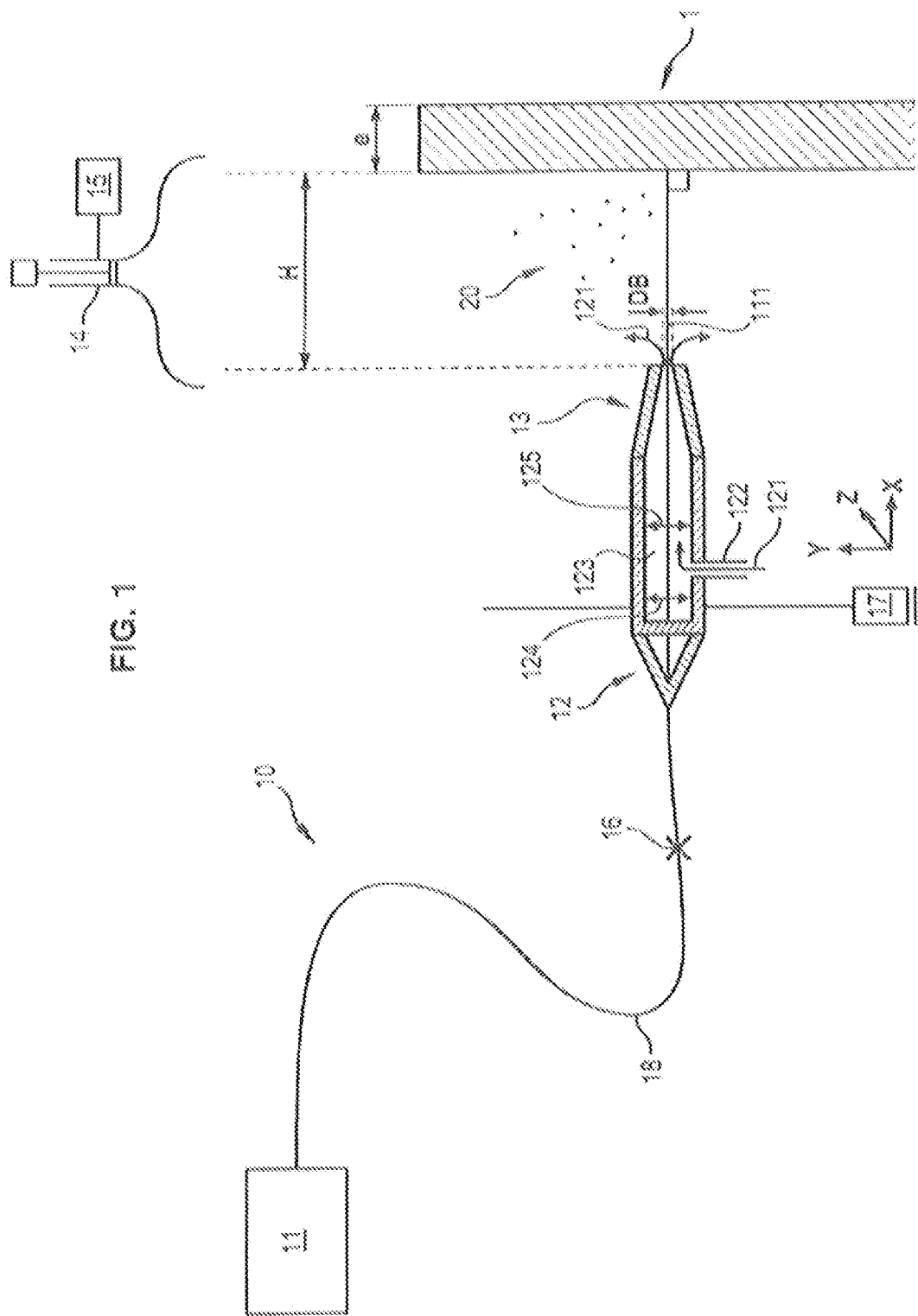
FIG. 1, already explained, illustrates a cutting system.

FIG. 1 illustrates a cutting system 10 mainly comprising
- a laser source 11 for producing a laser beam 111 having a power, for cutting out a piece 1 of a certain thickness e, and
- a cutting head 12 comprising an end nozzle 13 for the passage of the cutting laser beam 111.

The piece 1 is represented flat, but can also have any profile, for example curved.

The beam 111 must have typically a power of 1 kW per cm (10 mm) of piece thickness to be cut out, particularly for stainless steel.

The diameter of the nozzle 13 is referenced DB. It is in general 3 mm or 6 mm, but other values are obviously possible.

The source 11 is connected to the head by two optic fibres. The first one, situated outside the work site or the dismantling cell, is not contaminable, unlike the second one, situated inside the work site. Both two fibres are connected by means of an optical coupler 16. Each fibre is provided at each of the ends thereof with a connector which enables its dismantling: from the source, from the coupler and from the optic head. The replacement of the head 12 and the second fibre is thereby facilitated, particularly when the head 12 or the fibre has been used for dismantling nuclear facilities, and is thus likely to be radioactive through contamination.

The fibre 18 may be of any length, but is in general of a length of 100 m from the source 11 up to the coupler 16 (for a diameter of 400 μm for example), and 20 m from the coupler 16 to the head 12 (for a diameter of 600 μm for example).

The cutting position of the beam 111 is preferentially at right angles with respect to the piece 1 to be cut out, for example horizontally. The distance H between the end of the nozzle 13 and the piece 1 may be of different values, but is in general comprised between 5 and 30 mm, as a function of the power of the beam 111 and a piece thickness e.

The head 12 may be moved along five axes (three translations and two rotations) to carry out the cutting, by means of an actuator 17 (typically a five axis robot or a remote manipulator).

The movement of the head 12 takes place at a certain standard cutting speed V, during a cutting. It will be understood that a certain time is required to cut a thickness e of a piece 1, for a given power of the beam 111: if the head 12 moves too rapidly with respect to the piece 1, the cutting is not carried out correctly throughout the whole thickness e. The limit cutting speed $V_L$ designates the speed above which the piece 1 cannot be cut out.

The limit speed $V_L$ is never in practice reached on a dismantling work site, to ensure a safety margin and guarantee the cutting of the piece.

A coefficient k is thus defined, called limit speed coefficient of the cutting head 12, as the ratio between the standard cutting speed and the limit cutting speed of the piece 1, i.e.:

$$k = \frac{V}{V_L}$$

k takes in general the values 0.5 or 0.7 on work sites, but may have any value below 1 according to the desired safety margin.

In a conventional manner, the head 12 comprises an internal chamber 123 and an inlet 122, which is generally lateral, for pressurised gas 121 and filling the chamber 123. The nozzle 123 also lets the pressurised gas 121 that surrounds the beam 111 escape. The gas 121 makes it possible to evacuate the material from the piece 1 that is melted and vaporised by the beam 111. The gas 121 is in general air. A gas passage flow rate is of the order of 400 L/min.

The chamber 123 comprises a collimating lens 124 for the beam 111 and a focusing lens 125 for the beam 111. The focal length of the collimating lens 124 may be 80 mm for example, and the focal length of the focusing lens 125 may be 253 mm for example.

During the cutting of the piece 1 by the beam 111, of a quantity of aerosols 20 is produced.

General Principle of the Invention

The invention makes it possible to minimise the amount of aerosols 20 produced during cutting of the piece 1, by determining an optimal power Popt of the laser beam 111 of the cutting system 10.

To this end, the optimal power Popt of the laser beam 111 of the cutting system 10 is expressed, in an expression, in accordance
- with the piece 1 to be cut out, and/or
- with cutting parameters, and/or
- with the type of system 10, in order to minimize the amount of aerosols 20 produced when the piece 1 is being cut out.

The piece 1 is for example represented in the aforementioned expression by the value e of the piece thickness, but could for example also be represented by another parameter representative of the piece, such as the type of material and/or alloy composing the piece (304 L or 316 L type stainless steel for example).

The cutting parameters in the aforementioned expression are for example
- the distance H between the nozzle 13 and the piece 1, or
- the coefficient k, or also for example
- the impact diameter of the beam.

The type of system is for example represented in the aforementioned expression by the diameter DB, linked to the flow rate of gas 121, but other parameters could also be taken into account, such as
- the flow rate of gas,
- the nature of the gas,
- the cut-off pressure at the surface of the piece 1, or
- the type of optic fibre.

The cut-off pressure is linked to the kinetic energy of the gas 121 and results from the flow rate of gas 121, the diameter DB and the geometry of the nozzle 13, as well as the distance H.

A minimal cut-off pressure is required to ensure the cutting. Thus, for an impact diameter of the laser beam on the piece comprised between 2 and 4 mm, a pressure of 0.08 bars is required to cut out 10 mm of stainless steel. In practice, 0.25 bars is a value that ensures a satisfactory robustness for piece thicknesses below 80 mm. A pressure of 0.8 bars makes it possible to cut out stainless steel pieces up to 100 mm.

A higher cut-off pressure admittedly improves the productivity of the cutting, by providing a higher limit speed for the same power (a pressure of 0.8 bars thus makes it possible to double the cutting limit speed obtained with the impact pressure of 0.25 bars for thicknesses comprised between 20 and 80 mm), but it reduces the proportion of adherent slag to the profit of sedimented slag and aerosols favouring the evacuation of the molten material and slag which form inside the cutting edge.

The value of 0.25 is thus recommended for thicknesses below 80 mm and the value of 0.8 bars is recommended for thicknesses from 80 to 100 mm or from 20 to 80 mm if enhanced productivity is required.

General Principle of Determining the Power

In order to be able to determine the power Popt, it will be understood that it is necessary to go through an initial step of determining the expression of the power in accordance with the piece 1 to be cut out, and/or with cutting parameters, and/or with the type of system 10.

According to the initial step of determination represented in a schematic manner in FIG. 2, the system 10 carries out, during a step S1, a plurality of test cuttings of a piece 1 while varying the power of the beam 111, and/or the piece 1 to be cut out, and/or the cutting parameters and/or the type of system 10.

During S1, the system 10 thus performs cuttings with for example:
- different power values of the beam 111, and/or
- different values of thicknesses e of piece 1, and/or
- different values of k, and/or
- different values of H, and/or
- different values of DB.

During a step S2 a sensor 14 performs a plurality of corresponding measurements of the amount of aerosols 20 produced during each test cutting of the piece 1.

The sensor 14 used during step S2 particularly comprises a circuit of extraction by suction, a filter for the recovery of the aerosols 20, and a device for measuring the amount of aerosols removed.

A computer 15 known to those skilled in the art, comprising all conventional memory and processing means, and connected to the sensor 14, makes it possible to plot the curves of FIG. 3 to FIG. 9, representing in a general manner the evolution of the amount of aerosols produced as a function of the power of the beam 111. The curves of FIG. 3 to FIG. 9 are described more in detail hereafter in the present description.

The inventors have noted that the curves of FIG. 3 to FIG. 9 show that the amount of aerosols 20 is minimal for a certain power, called Popt in the present description.

Steps S3 and S4 thus make it possible to determine Popt in accordance with the measurements of the sensor 14.

To this end, during S3, the computer 15 expresses the quantity, for example noted M, of aerosols 20 produced during each test cutting of the piece 1 in accordance with the power of the beam 111, and/or the piece 1 to be cut out, and/or the cutting parameters and/or the type of system 10.

If the parameters taken into account are the power P, the thickness e, the coefficient k, the distance H and the nozzle diameter DB an expression of the following type is obstained, using the computer 15:

$$M=f(P,e,k,H,DB) \tag{E1}$$

To find the expression E1, the computer 15 thus performs the construction of a mathematical model in accordance with the measurements stemming from the sensor 14, using a plurality of regressions, for example linear, logarithmic, square, or other, and keeps the expression giving the model closest to the measurements, in other words the model gives a known mathematical correlation coefficient $R^2$ between the measurements and the values given by the model, such as for example:

$$R^2 > 0.9.$$

The amount M of aerosols produced may in reality be expressed in surface mass M2, in other words the mass of aerosols 20 as a function of the piece thickness and per meter of cut-out piece, expressed in $g/m^2$. The knowledge of M2 is likely to interest in primarily the operators of dismantling work sites. It is thus advantageously chosen to adjust the models.

The amount M of aerosols produced can also be expressed for example in mass M1 per unit length, in other words the mass of aerosols 20 produced per unit length of cut-out piece, carried into the extraction circuit of the sensor 14 and measured by the sensor 14, expressed in g/m.

The relation between M1 and M2 is known:

$$M_2 = \frac{10^3 \cdot M_1}{e}$$

Studies show that the results follow an identical evolution whether the measurements are carried out either in M1 or in M2.

Since the curves of FIGS. 3 to 9 show that the amount M (whether M1 or M2) as a function of the power comprises a minimum, the computer 15 finds said minimum by cancelling out, during step S4, a partial derivative of the expression (E1) of the amount of aerosols 20 produced with respect to the power of the laser beam. It is then known that the cancellation of the partial derivative corresponds to the minimum of P.

The computer 15 thus firstly performs:

$$\frac{\partial M}{\partial P} = \frac{\partial}{\partial P} f(P, e, k, H, DB) \quad (E2)$$

The computer 15 then also determines during step S4 the expression making it possible to cancel out said partial derivative in accordance with the piece 1 to be cut-out, and/or with cutting parameters and/or with the type of system 10. It is then known that the cancellation of the partial derivative corresponds to the optimum of P.

The computer 15 thus performs:

$$\frac{\partial M}{\partial P} = 0$$

to find the expression of P minimizing the amount of aerosols produced.

Example of Determination

During step S1, the system 10 performs a plurality of test cuttings of a piece 1 of thickness e, with a diameter DB of the nozzle 13 and a limit speed coefficient k of the cutting head 12.

The system 10 used comprises a laser source 11 of the yttrium aluminium garnet YAG type, for example disc-typed, capable of producing a laser beam 111 having a wavelength of the order of 1 μm.

During cuttings, the power P of the laser beam 111 is variable from 1 to 8 kW (powers of 3 kW, 5 kW and 8 kW are for example used), taking account of the fact that it is necessary to have around 1 kW for each cm of thickness of the piece available for the cutting to be effective.

The flow rate of gas 121 has been maintained constant and equal to 400 L/min during the plurality of cuttings.

The piece 1 to be cut out is a piece made of 316 L stainless steel (reference AFNOR standard: X2 Cr Ni Mo 18-10 1.4404) with thickness e, representative of the constituent components of a nuclear facility to be dismantled. During test cuttings, the thickness e varies for example from 10 mm to 80 mm.

During test cuttings, the diameters DB take the values 3 mm or 6 mm.

The values 0.1; 0.25; 0.5 and 0.7 are taken for k.

By way of information, the values of $V_L$ are reproduced in the following tables 1 and 2, for a 316L stainless steel piece—H 30 mm—Flow rate limit speed (mm/min).

TABLE 1

Limit cutting speeds for the nozzle of DB 3 mm.
limit speed (mm/min).

| e (mm) | VL 8 KW | VL 6 KW | VL 4 KW | VL 3 KW | VL 2 KW |
|---|---|---|---|---|---|
| 100 | 7.5 | | | | |
| 80 | 20 | | | | |
| 60 | 40 | 20 | | | |
| 40 | 125 | 75 | 20 | | |
| 30 | 200 | 125 | 75 | 40 | |
| 20 | 450 | 300 | 175 | 100 | 20 |
| 10 | 1200 | 900 | 600 | 400 | 200 |

400 L/min:

TABLE 2

Limit cutting speeds for the nozzle of DB 6 mm.

| e (mm) | VL 8 KW | VL 6 KW | VL 4 KW | VL 3 KW | VL 2 KW |
|---|---|---|---|---|---|
| 100 | | | | | |
| 80 | 10 | | | | |
| 60 | 30 | 15 | | | |
| 40 | 75 | 60 | 10 | | |
| 30 | 175 | 125 | 50 | 20 | |
| 20 | 350 | 250 | 125 | 70 | 10 |
| 10 | 1000 | 800 | 600 | 400 | 200 |

Table 3 hereafter summarises the measures of the sensor 14.

TABLE 3

| N° in the plane | Nozzle diameter DB mm | Laser power P kw | Plate thickness θ mm | Distance plate-neck H mm | Cutting speed k | Cutting speed VR m/min | Mass per unit length of aerosol $M_1$ g/m | Mass per unit length of aerosol IC ($M_1$) g/m | Surface mass of aerosol $M_2$ g/m² | Surface mass of aerosol IC ($M_2$) g/m² | Mass per unit length $[H_2]$ mg/m | Mass per unit length IC ($[H_2]$) mg/m | Volume Adherent slag V cm³/m | Mass defect of the plate $M_P$ g/m | Mass defect of the plate IC (Mp) g/m |
|---|---|---|---|---|---|---|---|---|---|---|---|---|---|---|---|
| 0 | 3 | 2.1 | 10 | 30 | 0.50 | 0.109 | 2.26 | 0.226 | | | 9.0 | 1.9 | 16.7 | 110 | 2 |
| 1 | 3 | 3 | 10 | 30 | 0.25 | 0.109 | 3.55 | 0.255 | 359 | 25 | 11.7 | 3.1 | 16.9 | 153 | 4 |
| 2 | 6 | 3 | 10 | 15 | 0.48 | 0.179 | 1.27 | 0.09 | 128 | 9 | 4.6 | 1.9 | 35.1 | 64 | 4 |
| 3 | 3 | 8 | 10 | 15 | 0.50 | 0.477 | 4.10 | 0.28 | 415 | 29 | 13.6 | 2.4 | 2.3 | 179 | 4 |
| 4 | 6 | 8 | 10 | 30 | 0.25 | 0.249 | 2.23 | 0.16 | 226 | 16 | 7.9 | 2.3 | 16.5 | 169 | 4 |
| 4 | 6 | 8 | 10 | 30 | 0.25 | 0.249 | 2.25 | 0.16 | 228 | 16 | 7.5 | 2.2 | 24.8 | 193 | 4 |
| 4 | 6 | 8 | 10 | 30 | 0.25 | 0.249 | 2.39 | 0.17 | 242 | 17 | 4.5 | 2.0 | 26.2 | 185 | 4 |
| 4 | 6 | 8 | 10 | 30 | 0.25 | 0.249 | 2.34 | 0.16 | 237 | 17 | 4.7 | 2.0 | | 171 | 4 |
| 5 | 3 | 3 | 20 | 30 | 0.49 | 0.044 | 12.5 | 0.9 | 611 | 42 | 31.6 | 6.0 | 17.5 | 292 | 7 |
| 5 | 3 | 3 | 20 | 30 | 0.49 | 0.044 | 10.9 | 0.8 | 534 | 37 | 24.2 | 6.7 | 37.2 | 275 | 10 |
| 6 | 6 | 3 | 20 | 15 | 0.25 | 0.015 | 12.2 | 0.9 | 595 | 43 | 5.2 | 6.2 | 91.9 | 106 | 20 |
| 7 | 3 | 8 | 20 | 15 | 0.24 | 0.109 | 0.84 | 0.88 | 432 | 43 | 19.8 | 5.8 | 20.9 | 393 | 10 |
| 8 | 6 | 8 | 20 | 30 | 0.50 | 0.199 | 2.90 | 0.20 | 141 | 10 | 6.2 | 2.9 | 126.0 | 276 | 6 |
| 8 | 6 | 8 | 20 | 30 | 0.50 | 0.199 | 3.41 | 0.24 | 167 | 12 | 5.0 | 2.9 | 148.5 | 247 | 6 |
| 9 | 3 | 8 | 30 | 30 | 0.25 | 0.056 | 15.7 | 1.1 | 504 | 37 | 13.7 | 6.3 | 58.0 | 586 | 22 |
| 10 | 3 | 8 | 60 | 30 | 0.24 | 0.010 | 32.4 | 3.3 | 533 | 55 | 27.9 | 19.3 | | 1336 | 42 |
| 11 | 3 | 8 | 30 | 30 | 0.49 | 0.109 | 10.6 | 0.7 | 340 | 24 | 20.9 | 6.1 | 15.3 | 692 | 11 |
| 11 | 3 | 8 | 30 | 30 | 0.49 | 0.109 | 10.0 | 0.7 | 322 | 23 | 20.0 | 5.5 | 22.1 | 662 | 10 |
| 12 | 3 | 8 | 60 | 30 | 0.50 | 0.021 | 33.8 | 2.4 | 556 | 40 | 67.3 | 14.9 | 135.3 | 925 | 22 |

TABLE 3-continued

| N° in the plane | Nozzle diameter DB mm | Laser power P kw | Plate thickness θ mm | Distance plate-neck H mm | Cutting speed | | Mass per unit length of aerosol | | Surface mass of aerosol | | Mass per unit length H$_2$ | | Volume Adherent slag | Mass defect of the plate | |
|---|---|---|---|---|---|---|---|---|---|---|---|---|---|---|---|
| | | | | | k — | VR m/min | M$_1$ g/m | IC (M$_1$) g/m | M$_2$ g/m$^2$ | IC (M$_2$) g/m$^2$ | [H$_2$] mg/m | IC ([H$_2$]) mg/m | V cm$^3$/m | M$_P$ g/m | IC (Mp) g/m |
| 13 | 3 | 8 | 80 | 30 | 0.57 | 0.010 | 40.4 | 2.9 | 504 | 38 | 59.7 | 22.5 | | 1576 | 45 |
| 14 | 3 | 5 | 30 | 30 | 0.70 | 0.070 | 8.41 | 0.59 | 270 | 19 | 16.2 | 6.1 | 85.4 | 390 | 10 |
| 15 | 3 | 8 | 30 | 30 | 0.71 | 0.159 | 8.47 | 0.37 | 208 | 12 | 19.7 | 6.5 | 11.6 | 657 | 11 |
| 17 | 3 | 8 | 60 | 30 | 0.71 | 0.030 | 32.5 | 1.9 | 534 | 31 | 62.7 | 15.0 | 99.0 | 1162 | 24 |
| 18 | 6 | 8 | 20 | 30 | 0.09 | 0.035 | 9.64 | 0.69 | 471 | 34 | 4.0 | 5.8 | 104.5 | 79 | 19 |
| 19 | 6 | 8 | 10 | 30 | 0.50 | 0.497 | 1.38 | 0.10 | 140 | 10 | 2.9 | 1.8 | 48.7 | 105 | 4 |
| 20 | 6 | 3 | 10 | 30 | 0.50 | 0.189 | 0.55 | 0.040 | 56 | 4 | 2.0 | 1.8 | 36.5 | 53 | 4 |
| 21 | 6 | 3 | 10 | 10 | 0.11 | 0.040 | 4.91 | 0.34 | 497 | 35 | 3.2 | 4.3 | 18.1 | 82 | 9 |
| 22 | 6 | 3 | 10 | 30 | 0.11 | 0.040 | 2.86 | 0.21 | 290 | 21 | 0.0 | | 43.3 | 53 | 10 |
| 23 | 3 | 8 | 60 | 15 | 0.24 | 0.010 | 43.7 | 3.2 | 719 | 55 | 27.6 | 19.0 | | 1259 | 43 |
| 25 | 6* | 3 | 10 | 0 | 0.11 | 0.040 | 4.75 | 0.33 | 481 | 34 | 4.5 | 4.9 | | 47 | 9 |

During step S2, the computer 15 constructs the curves of FIGS. 3 to 9, according to the measurements stemming from the sensor 14 and table 3 for the cuttings of step S1.

Figure 3A:
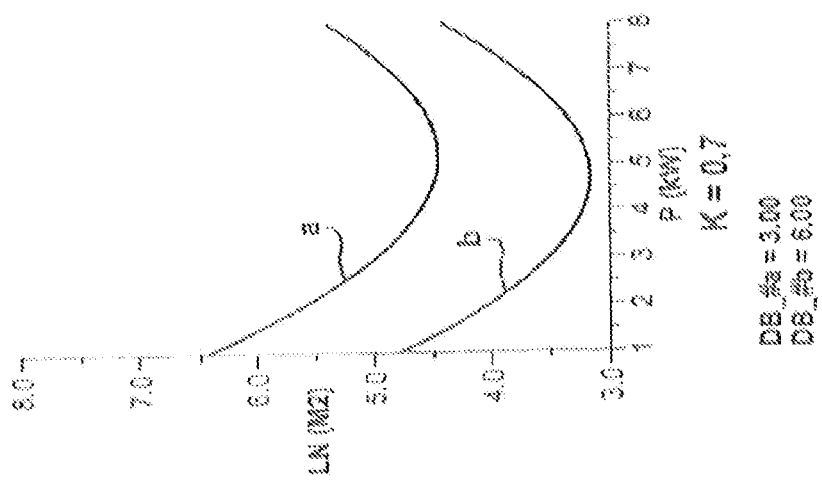
FIG. 3 illustrate the effect of the nozzle diameter DB on the production of aerosols as a function of the power of the laser beam, for speed coefficients k of 0.1, 0.5 and 0.7 (the distance nozzle-part H=30 mm), for a DB equal to 3 mm and 6 mm for a cut-out thickness of 10 mm.
Figure 3B:
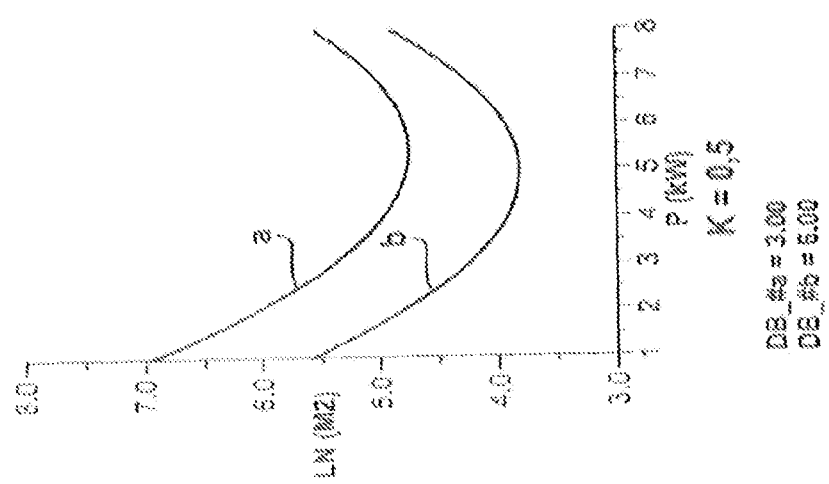
Figure 3C:
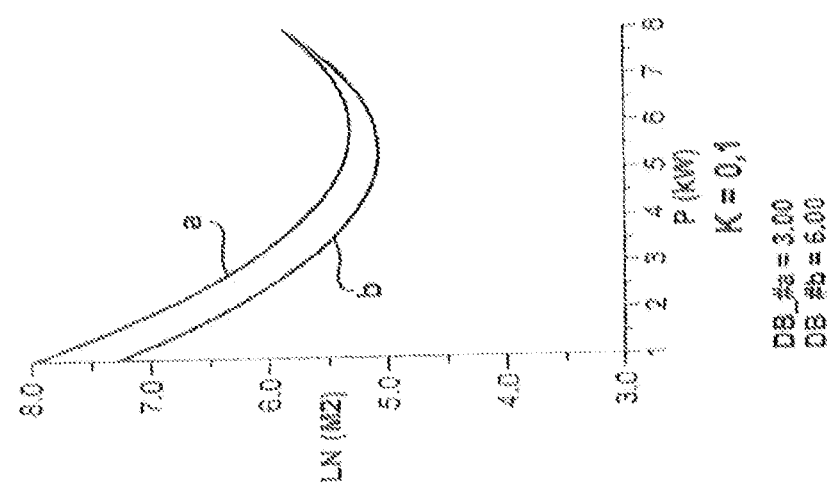
Figure 4A:
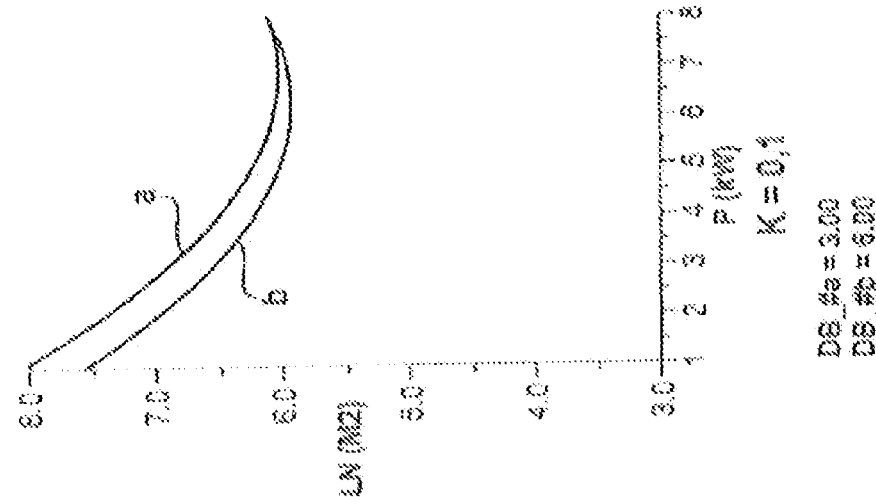
FIG. 4 illustrate the effect of the nozzle diameter DB on the production of aerosols as a function of the power of the laser beam, for speed coefficients k of 0.1, 0.5 and 0.7 (H=30 mm), for a DB equal to 3 and 6 mm for a cut-out thickness of 30 mm.
Figure 4B:
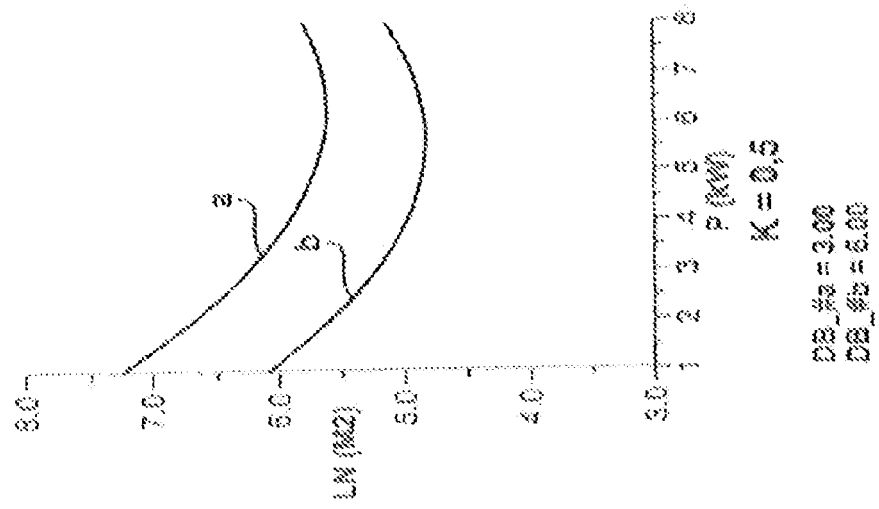
Figure 4C:
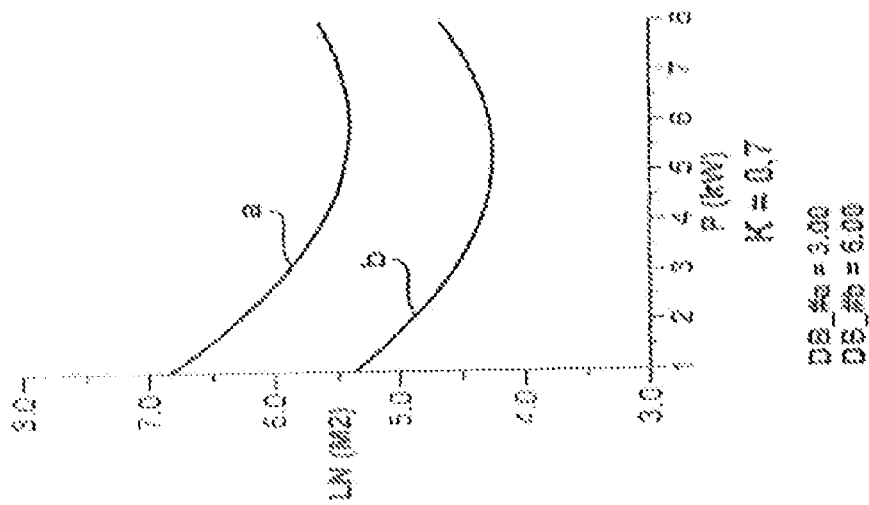

FIG. 3 and FIG. 4 show curves illustrating the evolution of the amount of aerosols produced (expressed by the logarithm LN of the surface mass M2 of aerosols produced (on the ordinate) as a function of the interaction between the power of the laser beam 111 P (on the abscissa) and the diameter of the nozzle DB, for three speed coefficients k (0.1, 0.5 and 0.7) and two thicknesses e (10 mm for FIG. 3 and 30 mm for FIG. 4).

The quadratic effect of the power may clearly be seen in FIG. 3 and FIG. 4, with a minimal amount of aerosols produced, which is not the same for the two nozzle diameters. The higher the speed coefficient (k=0.7) the more significant the effect of the nozzle diameter. At low speed (k=0.1) and maximal power (P=8 kW), there is no difference between the two nozzles. The speed coefficient k acts on the quantity of aerosols produced and a displacement of the optimal power, which diminishes when k increases, can be observed.

Figure 5A:
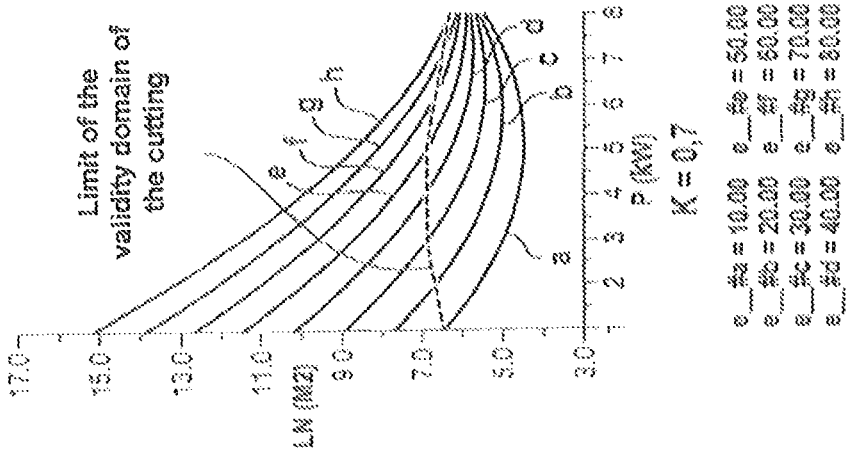
FIG. 5 illustrate the effect of the power of the laser on the production of aerosols as a function of the piece thickness e, for speed coefficients k of 0.1, 0.5 and 0.7 (H=30 mm) for a DB equal to 3 mm.
Figure 5B:
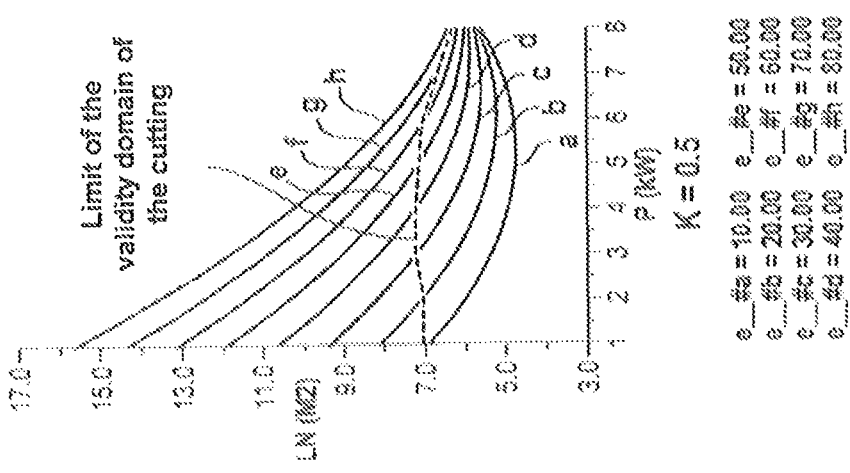
Figure 5C:
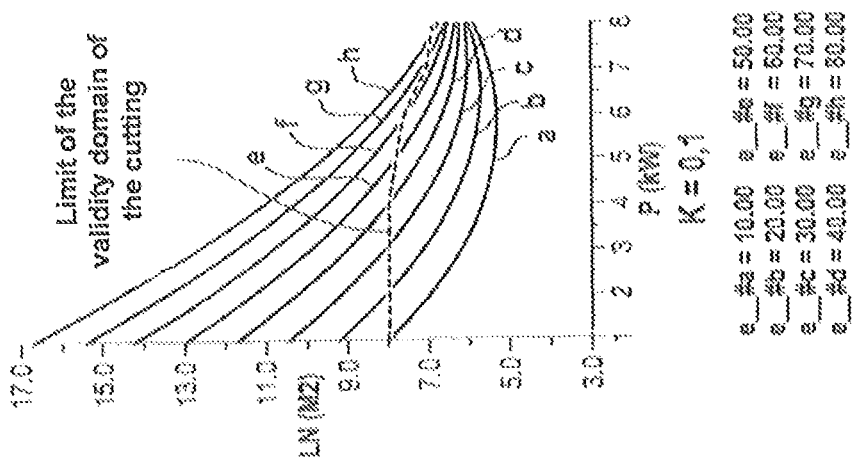

FIG. 5 and FIG. 6 show curves illustrating the evolution of the amount of aerosols produced (expressed by the logarithm LN 15 of the surface mass M2 of aerosols produced (on the ordinate) as a function of the interaction between the power of the laser beam 111 P (on the abscissa) and the thickness of the piece e (beam of curves a=10 mm to h=80 mm), for three speed coefficients k (0.1, 0.5 and 0.7), for two nozzle diameters DB (DB=3 mm for FIG. 5 and DB=6 mm for FIG. 6).

Here again the quadratic effect of the power is observed, with an optimal power that increases with the piece thickness and diminishes with the cutting speed.

The curves of FIGS. 5 and 6 are plotted without taking account of the constraint requiring 1 kW of power per centimeter of thickness of piece to be cut out. The domain of validity thereof must thus be reduced and the limit of this domain is given by the black curve which represents the upper limit thereof. This is plotted by joining up the points of curves a to h the abscissa of which corresponds to the minimal power required for cutting (curve a:e=10 mm, P=1 kW; curve b:e=20 mm, P=2 kW). The segments situated above this domain are thus not valid because there is no cutting.

Figure 8A:
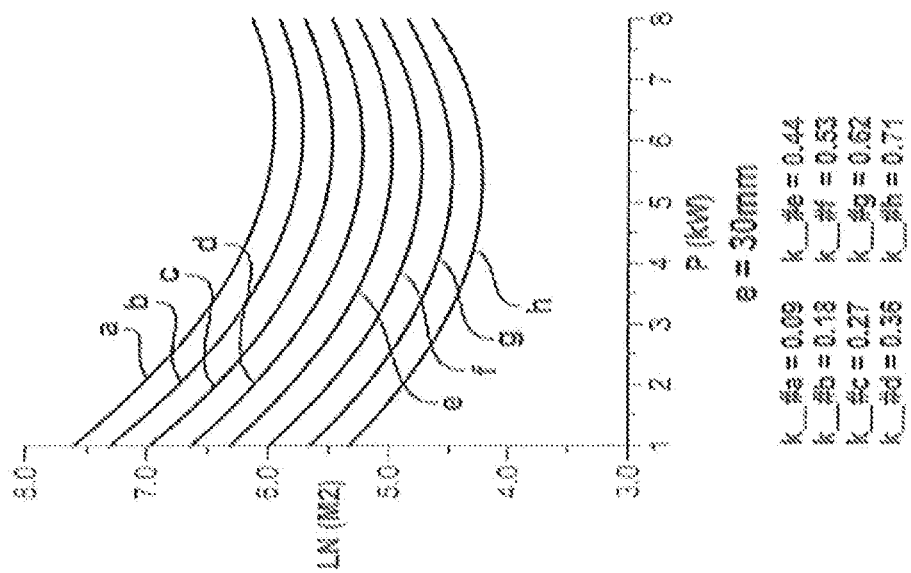
FIG. 8 illustrate the effect of the power of the laser on the production of aerosols as a function of the speed coefficients k, for thicknesses e of 10 and 30 mm (H=30 mm) for a DB equal to 6 mm.
Figure 8B:
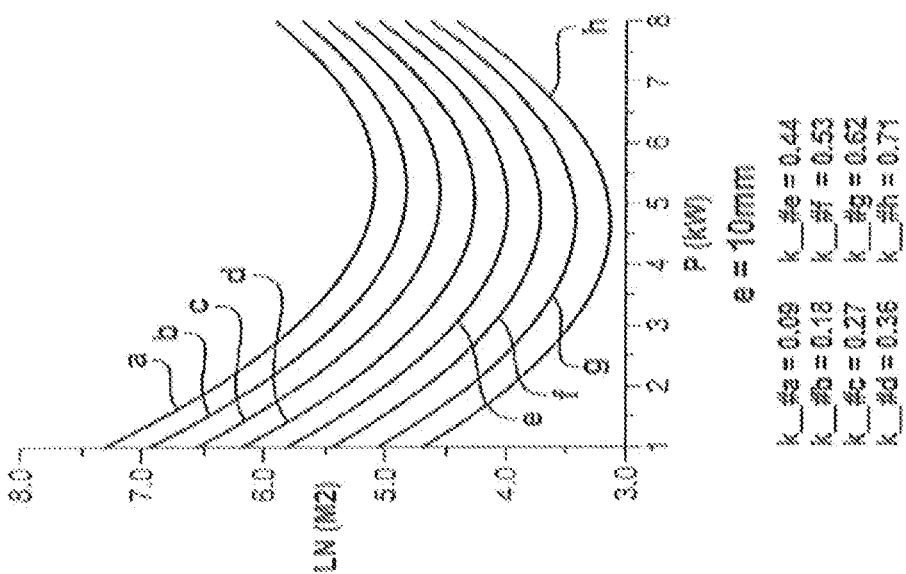

FIG. 7 and FIG. 8 show curves illustrating the evolution of the amount of aerosols produced (expressed by the logarithm LN of the surface mass M2 of aerosols produced (on the ordinate) as a function of the interaction between the power of the laser beam 111 P (on the abscissa) and the speed coefficient k, for two thicknesses of the part 10 mm and 30 mm and for two diameters of the nozzle DB (DB=3 mm for FIGS. 7 and 5 DB=6 mm for FIG. 8).

FIG. 7 and FIG. 8 make it possible to visualize the displacement of the optimal power as a function of the speed coefficient for a given thickness of piece. For the thickness of 30 mm, the minimal power is 3 kW for the cutting to take place, the scale of the abscissa axis varies thus from 3 to 8 kW.

Study of the curves of FIGS. 3 to 8 shows that to reduce the amount of aerosols produced, it is necessary to choose the highest speed coefficient. This coefficient corresponds to an optimal power dependent on the thickness of the piece to be cut out. These observations are valid for the two nozzles, but the amount of aerosols is less with the nozzle of 6 mm. It should be recalled that using the 3 mm nozzle is a constraint for high thicknesses.

FIG. 9 again show curves illustrating the evolution of the amount of aerosols produced (expressed by the logarithm LN of the surface mass M2 of aerosols produced (on the ordinate) as a function of the interaction between the power of the laser beam 111 P (on the abscissa) and the thickness of the piece e for thicknesses e varying from 40 to 80 mm (which implies a laser power P above 4 kW), and does so for two speed coefficients k (0.5 and 0.7). The black curve represents the upper limit of the domain of validity of the curves, to take account of the constraint of 1 kW of power per cm of thickness of the piece to be cut out.

During step S3, the computer 15 expresses the amount of aerosols 20 produced during each test cutting of the piece 1 as a function of the power P of the beam 111, the thickness e of the piece 1 to be cut out, the distance H, the coefficient k and the nozzle diameter DB of the system 10.

The computer 15 uses a logarithmic regression from the measurements of step S2 to give the best model. In our example and with the measures of table 3, the equation (E1) is expressed in the following manner:

$M_2 = \exp[5.386 - 0.208 \cdot (DB-4.45) + 0.039 \cdot (e-25.2) - 0.021 \cdot (H-25.7) - 1.99 \cdot (k-0.38) + 0.033 \cdot (DB-4.45) \cdot (P-6.34) - 0.547 \cdot (DB-4.45) \cdot (k-0.38) - 0.016 \cdot (P-6.34) \cdot (e-25.2) + 0.257 \cdot (P-6.34) \cdot (k-0.38) + 0.115 \cdot (P-6.34)^2]$.

(E1)

The correlation coefficient of (E1) with respect to the measurements of table 3 is $R^2 = 0.9115$.

It will be understood that among the parameters taken into account in (E1), it may be considered that certain may be chosen as constants, because in practice, certain values do not vary during work site cuttings. One may thus choose for example H=constant to simplify the expressions.

The equation (E2) corresponding to the partial derivative of the expression of (E1) of the amount of aerosols 20 produced is thus $$\frac{\partial}{\partial P}\ln M_2 = [0.033 \cdot (DB - 4.45) - \\ 0.016 \cdot (e - 25.2) + 0.257 \cdot (k - 0.38) + 0.230 \cdot (P - 6.34)] \quad (E2)$$

The computer 15 then determines the expression making it possible to cancel out said partial derivative, in accordance with the piece 1 to be cut out, with cutting parameters and with the type of system 10.

By posing:

$$\frac{\partial}{\partial P}\ln M_2 = 0$$

the computer 15 finds $$Popt = -0.14 \cdot DB + 0.07 \cdot e - 1.12 \cdot k + 5.64 \quad (E3)$$

Thus, for a system 10 comprising a laser source 11 of the yttrium aluminium garnet YAG type, for example disc-typed, capable of producing a laser beam 111 having a wavelength of the order of 1 µm (for example 1.03 µm), a predetermined quadruplet of constants is defined $(\alpha; \beta; \gamma; \delta)$, representative of the type of cutting system 10, such that:

$$Popt = \alpha \cdot DB + \beta \cdot e + \gamma \cdot k + \delta$$

where DB is the diameter of the nozzle 13, in millimeters, e is the thickness of the piece 1, in millimeters, and k is the limit speed coefficient of the cutting head 12, namely the ratio between the standard cutting speed and the limit cutting speed of the piece 1, such that:

(−0.14; 0.07; −1.12, 5.64).

Thus step S5 of determining the cutting power Pd is preferably the power Popt, which minimises the amount of aerosols 20 produced when the piece 1 is being cut out, while ensuring that the power Pd is at least equal to the cutting power (it will be recalled that it is necessary for the cutting to be effective, to have available around 1 kW for each cm of thickness of the piece).

A minimal power Pmin equal to λe may thus be defined, such that λ is a leading coefficient representing the number of kW required for cutting the piece per mm of thickness of the piece 1 (in our example 0.1), and e is the thickness of the piece, in mm.

If Popt is such that

Popt<(λe=Pmin)

then λe will be taken for Pd.

On the other hand, if Popt is such that

Popt>(λe=Pmin)

then Popt will be taken for Pd.

Example of Application

For a nozzle diameter DB of 3 mm, and a coefficient k of 0.5, and if it is wished to cut a part of a thickness e of 40 mm, the optimal power Popt of the beam 111 is 7.46 kW, i.e. substantially 7.5 kW.

If, for a same nozzle diameter DB, it is sought to cut the same piece 1 with a coefficient k of 0.7, then the optimal power Popt of the beam 111 is 7.24 kW, i.e. substantially 7.25 kW.

It will be noted that if it is wished to cut a piece of a thickness e of 50 mm, with a coefficient k of 0.5, then the power Popt is 8.16 kW. In general, the aforementioned type of source 11 has a maximal power of 8 kW. One could then in this case either apply the maximal power of 8 kW for the cutting;

or carry out the cutting with a system having a source 11 having a maximal power above 8 kW.

The invention claimed is:

1. An optimised laser cutting method for cutting out a piece from a material by a cutting system comprising a laser source for producing a laser beam having a power, and a cutting head comprising an end nozzle for the passage of the cutting laser beam, wherein the method is characterized in that it comprises a step of determining a cutting power Pd such that Pd=Max(Popt;λe)

where Max is the mathematical operator of the maximum,

Popt is an optimal power of the laser beam of the cutting system, which is determined in accordance with of the piece to be cut out, and/or with cutting parameters and/or with the type of system, in order to minimize the amount of aerosols produced when the piece is being cut out, λ is a leading coefficient representing the number of kW required for cutting out the piece per mm of thickness of the piece, and e is the thickness of the part, in mm.

2. The method according to claim 1, wherein the determination of Popt is carried out using a predetermined quadruplet of constants $(\alpha; \beta; \gamma; \delta)$ representative of the type of cutting system, such that:

$$Popt = \alpha \cdot DB + \beta \cdot e + \gamma \cdot k + \delta$$

where DB is the diameter of the nozzle, in millimeters, e is the thickness of the piece, in millimeters, and k is the limit speed coefficient of the cutting head, namely the ratio between the standard cutting speed and the limit cutting speed of the part.

3. The method according to claim 2, wherein the predetermined quadruplet of constants $(\alpha; \beta; \gamma; \delta)$, representative of a cutting system comprising a laser source of the yttrium aluminium garnet YAG type for a laser beam having a wavelength of the order of 1 µm, is (−0.14; 0.07; −1.12, 5.64).

4. The method according to claim 1, comprising an initial step of determining an expression of the power of the laser beam in accordance with the piece to be cut out, and/or with cutting parameters, and/or with the type of system, initial step according to which:

the system performs a plurality of test cuttings of a piece while varying the power of the beam, and/or the piece to be cut out, and/or the cutting parameters and/or the type of system;

a sensor performs a plurality of corresponding measurements of the amount of aerosols produced during each test cutting of the piece, a computer expresses the amount of aerosols produced during each test cutting of the piece in accordance with the power of the beam, and/or with the piece to be cut out, and/or with cutting parameters and/or with the type of system;

performs a partial derivative of the expression of the amount of aerosols produced, with respect to the power of the laser beam, and determines the expression making it possible to cancel out said partial derivative in accordance with the piece to be cut out, and/or with cutting parameters and/or with the type of system.

5. The method according to claim 2, comprising an initial step of determining an expression of the power of the laser beam in accordance with the piece to be cut out, and/or with cutting parameters, and/or with the type of system, initial step according to which:

the system performs a plurality of test cuttings of a piece while varying the power of the beam, and/or the piece to be cut out, and/or the cutting parameters and/or the type of system;

a sensor performs a plurality of corresponding measurements of the amount of aerosols produced during each test cutting of the piece, a computer expresses the amount of aerosols produced during each test cutting of the piece in accordance with the power of the beam, and/or with the piece to be cut out, and/or with cutting parameters and/or with the type of system;

performs a partial derivative of the expression of the amount of aerosols produced, with respect to the power of the laser beam, and determines the expression making it possible to cancel out said partial derivative in accordance with the piece to be cut out, and/or with cutting parameters and/or with the type of system.

6. The method according to claim 3, comprising an initial step of determining an expression of the power of the laser beam in accordance with the piece to be cut out, and/or with cutting parameters, and/or with the type of system, initial step according to which:

the system performs a plurality of test cuttings of a piece while varying the power of the beam, and/or the piece to be cut out, and/or the cutting parameters and/or the type of system;

a sensor performs a plurality of corresponding measurements of the amount of aerosols produced during each test cutting of the piece, a computer expresses the amount of aerosols produced during each test cutting of the piece in accordance with the power of the beam, and/or with the piece to be cut out, and/or with cutting parameters and/or with the type of system;

performs a partial derivative of the expression of the amount of aerosols produced, with respect to the power of the laser beam, and determines the expression making it possible to cancel out said partial derivative in accordance with the piece to be cut out, and/or with cutting parameters and/or with the type of system.

* * * * *